(12) United States Patent
Sato et al.

(10) Patent No.: US 10,775,581 B2
(45) Date of Patent: Sep. 15, 2020

(54) OPTICAL CABLE AND SHEATH REMOVING METHOD

(71) Applicant: FUJIKURA LTD., Tokyo (JP)

(72) Inventors: Shinnosuke Sato, Sakura (JP); Mizuki Isaji, Sakura (JP); Kouji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/465,628

(22) PCT Filed: Nov. 15, 2017

(86) PCT No.: PCT/JP2017/041103
§ 371 (c)(1),
(2) Date: May 31, 2019

(87) PCT Pub. No.: WO2018/101041
PCT Pub. Date: Jun. 7, 2018

(65) Prior Publication Data
US 2019/0310437 A1    Oct. 10, 2019

(30) Foreign Application Priority Data

Dec. 1, 2016   (JP) .................................. 2016-233839

(51) Int. Cl.
*G02B 6/44*   (2006.01)

(52) U.S. Cl.
CPC ............ *G02B 6/4497* (2013.01); *G02B 6/44* (2013.01); *G02B 6/449* (2013.01); *G02B 6/4432* (2013.01); *G02B 6/4486* (2013.01)

(58) Field of Classification Search
CPC .. G02B 6/4432; G02B 6/4486; G02B 6/4497; G02B 6/449; G02B 6/44
See application file for complete search history.

(56) References Cited

U.S. PATENT DOCUMENTS

| 4,805,392 A | 2/1989 | Seveso et al. |
| 6,466,720 B1 * | 10/2002 | Fishlock ............. G02B 6/4479 |
| | | 264/1.28 |
| 10,061,096 B2 | 8/2018 | Takeda et al. |
| (Continued) | | |

FOREIGN PATENT DOCUMENTS

| AU | 2014385023 B2 | 3/2017 |
| CA | 2936064 C | 1/2018 |
| (Continued) | | |

*Primary Examiner* — Jennifer Doan
(74) *Attorney, Agent, or Firm* — Osha Liang LLP

(57) ABSTRACT

An optical cable includes: an optical fiber unit where a plurality of optical fibers are wrapped with a wrapping tape; at least three tensile strength members disposed in parallel with and on an outer side of the optical fiber unit at intervals in a circumferential direction; and a sheath that coats the optical fiber unit and the tensile strength members and that is disposed between the optical fiber unit and the tensile strength members. An inner wall surface of the sheath formed between the optical fiber unit and the tensile strength members protrudes toward a cable center in comparison with an inner wall surface of the sheath where none of the tensile strength members are disposed. A portion of the wrapping tape disposed on the inner wall surface that protrudes toward the cable center is depressed toward the cable center.

10 Claims, 9 Drawing Sheets

(56) References Cited

U.S. PATENT DOCUMENTS

| | | | |
|---|---|---|---|
| 2002/0126970 A1 | 9/2002 | Anderson et al. | |
| 2008/0203639 A1* | 8/2008 | Thomas | B63B 21/08 |
| | | | 269/257 |

FOREIGN PATENT DOCUMENTS

| | | | |
|---|---|---|---|
| CN | 1184946 A | 6/1998 |
| CN | 103477256 A | 12/2013 |
| CN | 103744151 A | 4/2014 |
| CN | 104937466 A | 9/2015 |
| DE | 4236251 A1 | 4/1994 |
| EP | 3115816 A1 | 1/2017 |
| JP | S63-005313 A | 1/1988 |
| JP | 2010204368 A | 9/2010 |
| JP | 2015041037 A | 3/2015 |
| JP | 2015102581 A | 6/2015 |
| JP | 3198825 U | 7/2015 |
| JP | 2015169756 A | 9/2015 |
| JP | 2016080747 A | 5/2016 |
| KR | 2016-0067167 A | 6/2016 |

\* cited by examiner

DEGREE OF DEPRESSION $H(\%) = \dfrac{(R-r)}{R} \times 100$

US 10,775,581 B2

OPTICAL CABLE AND SHEATH REMOVING METHOD

TECHNICAL FIELD

The present invention relates to an optical cable and a sheath removing method.

BACKGROUND

Patent Literature 1 describes an optical fiber cable to be laid in a microduct (thin tubular duct) by air blown installation. Patent Literature 1 describes that three tensile strength members are buried in a sheath at 120-degree intervals around a loose tube (tube housing a plurality of optical fibers with filler capable of stopping water).

Patent Literature 2 describes an optical cable housing, in a sheath, an optical fiber unit formed by wrapping a plurality of optical fibers with a wrapping tape. Patent Literature 2 describes that two tensile strength members are buried in the sheath in such a manner as to sandwich a housing part housing the optical fiber unit.

PATENT LITERATURE

Patent Literature 1: JP 2010-204368A
Patent Literature 2: JP 2015-169756A

In the optical fiber cable described in Patent Literature 1, three tensile strength members are arranged in a twisted state around the loose tube. With this structure, simply removing the sheath to take out the optical fibers from the optical fiber cable leaves the tensile strength members in the way, and this makes it difficult to take out the optical fibers. For this reason, to take the optical fibers out from the optical fiber cable described in Patent Literature 1, it is necessary, for example, to cut off the tensile strength members.

The tensile strength members described in Patent Literature 1 are arranged in a twisted state so as to be in contact with the loose tube. However, assume that the tensile strength members are longitudinally attached in a state of being in contact with a member such as the optical fiber unit described in Patent Literature 2 (aggregation formed by wrapping a plurality of optical fibers with a wrapping tape), instead of a loose tube, on an inner side of the tensile strength members. In such a case, when the optical cable is bent, the tensile strength members come to dig into the inner part (optical fiber unit), and this may cause damage to the optical fibers and an increase in transmission loss.

SUMMARY

One or more embodiments of the invention provide anew optical cable from which optical fibers are easily taken out.

One or more embodiments of the present invention are an optical cable including: an optical fiber unit in which a plurality of optical fibers are wrapped with a wrapping tape; at least three tensile strength members that are arranged on an outer side of the optical fiber unit at intervals in a circumferential direction; and a sheath that coats the optical fiber unit and the tensile strength members, wherein the tensile strength members are arranged in parallel with the optical fiber unit, the sheath is formed between the optical fiber unit and the tensile strength members, an inner wall surface of the sheath formed between the optical fiber unit and the tensile strength members protrudes toward a cable center in comparison with an inner wall surface of the sheath arranged with none of the tensile strength members, and a portion of the wrapping tape arranged on the inner wall surface protruding toward the cable center are depressed toward the cable center.

Other features of one or more embodiments of the present invention are made clear by the following description and the drawings.

According to one or more embodiments of the present invention, optical fibers can easily be taken out.

DETAILED DESCRIPTION

Figure 1:
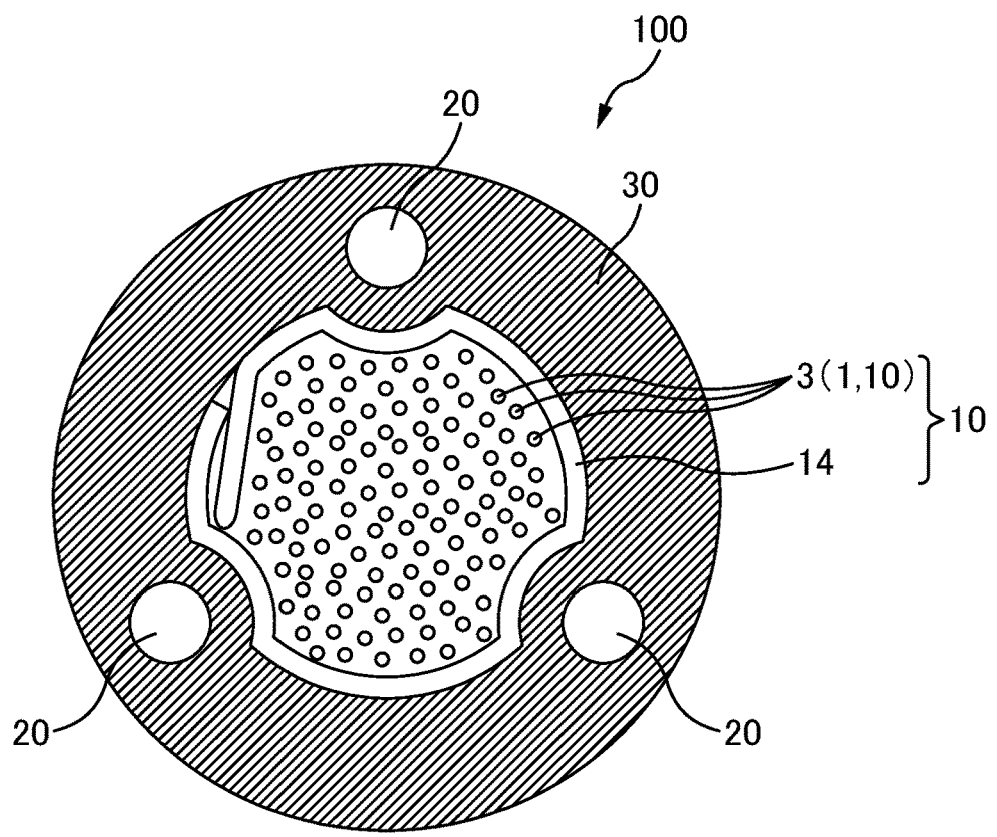
FIG. 1 is a cross-sectional view of an optical cable 100 according to one or more embodiments.

At least the following matters are made clear from the following description and the drawings.

Disclosed is an optical cable including: an optical fiber unit in which a plurality of optical fibers are wrapped with a wrapping tape; at least three tensile strength members that are arranged on an outer side of the optical fiber unit at intervals in a circumferential direction; and a sheath that coats the optical fiber unit and the tensile strength members, wherein the tensile strength members are arranged in parallel with the optical fiber unit, the sheath is formed between the optical fiber unit and the tensile strength members, an inner wall surface of the sheath formed between the optical fiber unit and the tensile strength members protrudes toward a cable center in comparison with an inner wall surface of the sheath arranged with none of the tensile strength members, and a portion of the wrapping tape arranged on the inner wall surface protruding toward the cable center are depressed toward the cable center. With this optical cable, the optical fibers are easily taken out.

In one or more embodiments, the number of the tensile strength members of the optical cable is three. In this way, it is possible to obtain an optical cable having an isotropic bending direction with the fewest possible tensile strength members.

In one or more embodiments, assuming that an inner radius of the depressed portion of the wrapping tape is r, an inner radius of a non-depressed portion of the wrapping tape is R, and a degree of depression H (%) is $H=(R-r)/R*100$, the degree of depression H (%) is 20% or lower. In this way, an increase in transmission loss of the optical fiber can be suppressed.

In one or more embodiments, a tangent line on an outer side of two adjacent ones of the tensile strength members is positioned on an outer side of the optical fiber unit. In this way, damage to the optical fiber unit can be prevented.

In one or more embodiments, part of the optical fiber unit is positioned on an outer side of a tangent line on an outer side of two adjacent ones of the tensile strength members. In this way, the optical fibers are easily taken out.

Disclosed is a sheath removing method including: (1) preparing an optical cable including an optical fiber unit in which a plurality of optical fibers are wrapped with a wrapping tape, at least three tensile strength members that are arranged on an outer side of the optical fiber unit at intervals in a circumferential direction, and a sheath that coats the optical fiber unit and the tensile strength members, the tensile strength members being arranged in parallel with the optical fiber unit; and (2) removing the sheath by causing a blade of a tool to touch the sheath of the optical cable so that the blade of the tool crosses the length direction of the optical cable and moves the tool in the length direction. With this sheath removing method, optical fibers are easily taken out.

In one or more embodiments, the tool is moved in the length direction while the blade of the tool is being guided by the tensile strength members. This makes it easier for an operator to remove the sheath.

In one or more embodiments, in removing the sheath, the blade of the tool is in contact with two adjacent ones of the tensile strength members. In this way, a blade of a tool can be prevented from digging further.

In one or more embodiments, in removing the sheath with the tool, the wrapping tape is deformed so as to be depressed toward an inner side with the blade moving in the length direction. In this way, the optical fibers are easily taken out.

Structure of Optical Cable 100

FIG. 1 is a cross-sectional view of an optical cable 100 according to one or more embodiments. The optical cable 100 according to one or more embodiments includes an optical fiber unit 10, at least three tensile strength members 20, and a sheath 30.

The optical fiber unit 10 is a unit (aggregation) formed by wrapping the plurality of optical fibers 3 with a wrapping tape 14. The optical fiber unit 10 is also referred to as an "optical cable core", an "optical fiber core", a "core unit", or simply a "unit", or the like in some cases. In one or more embodiments, the optical fiber unit 10 includes a plurality of bundle units 11 (refer to FIG. 2A) each formed by bundling a plurality of optical fiber ribbons 1 with a bundling member 12 and is formed by wrapping the plurality of bundle units 11 with the wrapping tape 14. Note that the bundle of the plurality of optical fibers 3 wrapped with the wrapping tape 14 is not limited to one constituted of the plurality of bundle units 11 and may be formed, for example, by bundling a number of single optical fibers 3.

Figure 2A:
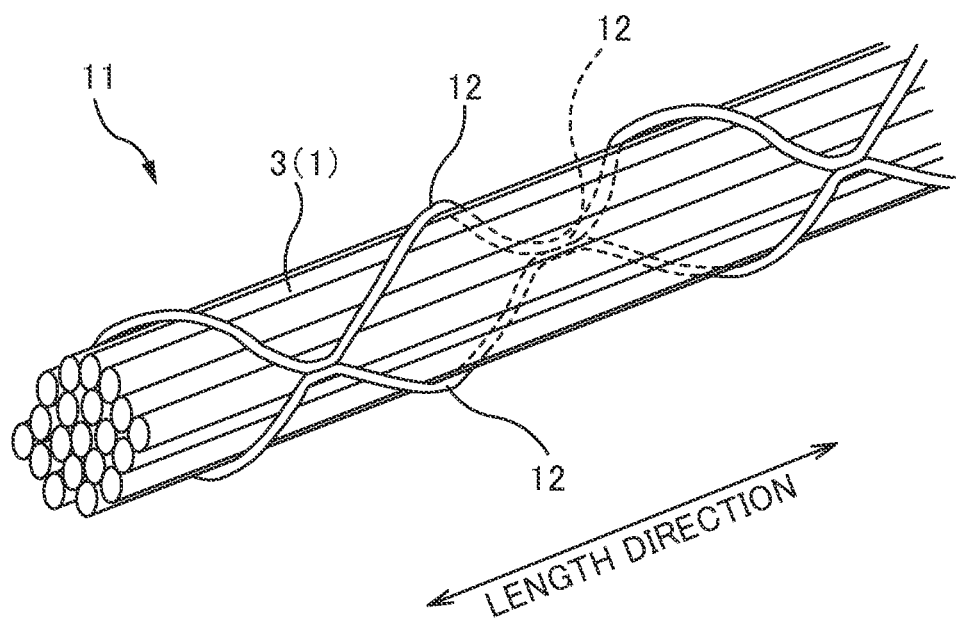
FIG. 2A is an explanatory diagram of a bundle unit 11.

FIG. 2A is an explanatory diagram of the bundle unit 11. The bundle unit 11 has a structure in which bundles of the plurality of optical fibers 3 are bundled with the bundling member 12. The bundle unit 11 is sometimes referred to as a "subunit" or the like. The bundling member 12 is a thread-like, string-like, or tape-like member that can bundle the plurality of optical fibers 3. The bundle unit 11 can be distinguished from another bundle unit 11, based on an identification color of the bundling member 12. Note that an identification mark may be formed on the bundling member 12. In the bundle unit 11 in the drawing, the plurality of optical fibers 3 are bundled by winding two bundling members 12 in an S-Z configuration. However, the plurality of optical fibers 3 may be bundled by winding a single bundling member 12 around the optical fibers 3 in a spiral manner. The bundles of the optical fibers 3 are formed by bundling the plurality of intermittently connected optical fiber ribbons 1.

Figure 2B:
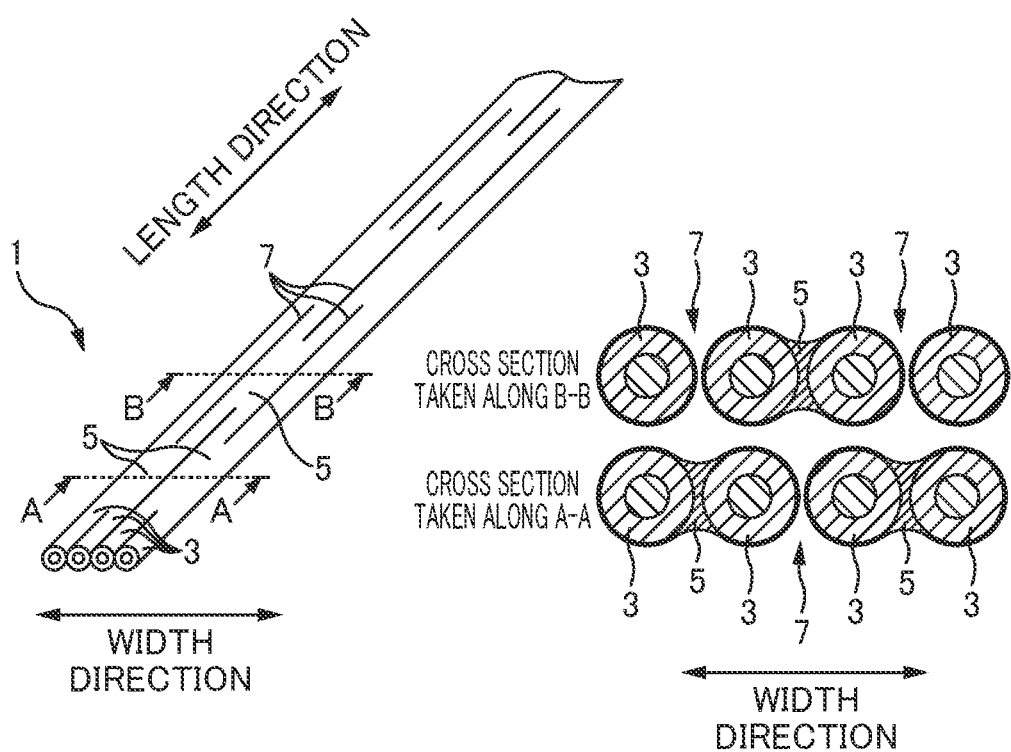
FIG. 2B is an explanatory diagram of an intermittently connected optical fiber ribbon 1.

FIG. 2B is an explanatory diagram of the intermittently connected optical fiber ribbon 1. The drawing on the right side of FIG. 2B is a cross-sectional view taken along A-A or B-B in a perspective view on the left side. In the following description, as illustrated in FIG. 2B, a direction parallel with the optical fibers 3 constituting the optical fiber ribbon 1 is referred to as a "length direction". A direction in which the plurality of optical fibers 3 constituting the optical fiber ribbon 1 are aligned is referred to as a "width direction".

The intermittently connected optical fiber ribbon 1 is an optical fiber ribbon 1 including the plurality of optical fibers 3 arranged side by side and connected intermittently. Two adjacent ones of the optical fibers 3 are connected with a connection part 5. A plurality of connection parts 5 connecting two adjacent optical fibers 3 are arranged intermittently in the length direction. The plurality of connection parts 5 of the optical fiber ribbon 1 are arranged intermittently and two-dimensionally in the length direction and the width direction. The connection parts 5 are formed by, after application of ultraviolet curing resin to serve as connection agent, irradiating the ultraviolet curing resin with ultraviolet rays for solidification. Note that the connection parts 5 may be formed of thermoplastic resin. Regions other than the connection parts 5 between the two adjacent optical fibers 2 constitute non-connected parts 7 (separation parts). In the non-connected parts 7, the two adjacent optical fibers 3 are not restrained. Thus, the optical fiber ribbon 1 can be rolled up into a cylindrical form (a bundle), or folded up, and the multitude of optical fibers 3 can be bundled with high density. To separate any of the optical fibers 3 from the optical fiber ribbon 1, an operator breaks the connection parts 5 by, for example, tearing off the optical fibers 3.

Note that the intermittently connected optical fiber ribbon 1 is not limited to that illustrated in FIG. 2B. For example, the number of optical fibers of the optical fiber ribbon 1 may be changed. Moreover, the arrangement of the intermittently arranged connection parts 5 may be changed.

The wrapping tape 14 is a member that wraps the plurality of optical fibers 3. Wrapping the optical fibers 3 with the wrapping tape 14 can prevent, when coating is applied with molten resin to form the sheath 30, the optical fibers 3 from being buried in (digging into) the sheath 30. A polyimide tape, a polyester tape, a polypropylene tape, a polyethylene tape, or the like is used for the wrapping tape 14. Alternatively, nonwoven fabric may be used as the wrapping tape 14. In this case, tape-like nonwoven fabric made of polyimide, polyester, polypropylene, polyethylene, or the like is used. The wrapping tape 14 may be nonwoven fabric with a film, such as a polyester film, being stuck thereto.

The wrapping tape 14 is formed by attaching (or applying) water-absorbing powder to a tape-like base. Hence, the wrapping tape 14 functions as a water-absorbing tape. The water-absorbing powder is granular or powdery material having water absorbing properties (water-absorbing material). The water-absorbing powder may be attached (applied) to a surface of the tape-like base or may be provided in a sandwiched manner between tape-like bases made of two pieces of nonwoven fabric. At the time when water is absorbed (the water-absorbing powder absorbs water), granular or powdery water-absorbing powder expands to be jellied (swelling). As such water-absorbing powder, a superabsorbent starchy, cellulosic, polyacrylic acid, polyvinyl alcohol, or polyoxyethylene material having a grain size of 5 to 30 μm, a mixture of these, or the like may be used, for example. The jellied water-absorbing powder fills the gap in the optical cable 100 to stop water in the optical cable 100. Note that the base itself may have water absorbing property. The wrapping tape 14 may not necessarily have water absorbing properties.

The tensile strength members 20 are members that hold against contraction of the sheath 30 and suppress distortion and bending applied to the optical fiber unit 10 (especially, the optical fibers 3) due to the contraction of the sheath 30. The tensile strength members 20 are linear members and are buried in the sheath 30. As a material of the tensile strength members 20, a nonmetallic material or a metallic material may be used. As the nonmetallic material, glass FRP (GFRP), aramid fiber reinforced plastics reinforced by Kevler (trademark) (KFRP), or fiber reinforced plastics (FRP), such as polyethylene fiber reinforced plastics reinforced by polyethylene fiber, may be used, for example. As the metallic material, a metallic wire, such as a steel wire, may be used.

The optical cable 100 according to one or more embodiments includes at least three tensile strength members 20. Here, the three tensile strength members 20 are buried in the sheath 30. The three tensile strength members 20 are arranged at equal intervals (here, intervals of 120 degrees) in a circumferential direction. With at least three tensile strength members 20 being thus arranged at intervals in the circumferential direction, the optical cable 100 can have isotropic bending directional properties. In a case that the number of tensile strength members 20 is three, the optical cable 100 having isotropic bending directional properties can be obtained with the fewest possible tensile strength members 20. Note that, however, the number of tensile strength members 20 is not limited to three and may be four or more. In a case that the optical cable 100 includes N tensile strength members 20, the N tensile strength members 20 are arranged at intervals of 360 degrees/N in the circumferential direction. For example, in a case that the optical cable 100 includes four tensile strength members 20, the four tensile strength members 20 are arranged at 90-degree intervals in the circumferential direction. In the region surrounded by at least three tensile strength members 20, a housing part of the optical fiber unit 10 is formed.

Assume a case where two tensile strength members 20 are arranged to sandwich the optical fiber unit 10. In this case, the optical cable 100 is easily bent in particular directions (bending directions having the line linking the two tensile strength members 20 as a neutral axis) and is difficult to be bent in other directions. If the bending directions of the cable are thus limited, characteristics of air blowing to a microduct deteriorate. In contrast to this, in the case of the optical cable 100 according to one or more embodiments, isotropic bending directional properties can be obtained, and hence excellent characteristics of air blowing to a microduct can be obtained.

The sheath 30 is a member for coating the optical fiber unit 10 and the tensile strength members 20. The outside shape (cross section) of the sheath 30 is circular. As a material of the sheath 30, resin, such as polyvinyl chloride (PVC), polyethylene (PE), nylon (trademark), fluorinated ethylene, or polypropylene (PP), may be used, for example. In the case of using polyethylene (PE), high-density polyethylene, medium-density polyethylene, low-density polyethylene, straight-chain low-density polyethylene, or the like may be used. As a material of the sheath 30, a polyolefin compound containing, as fire retardant, a hydrated metal compound, such as magnesium hydroxide or aluminum hydroxide, may be used, for example. Note that a member different from the optical fiber unit 10 and the tensile strength members 20 may be buried in the sheath 30.

In the formation of the sheath 30 by extrusion molding of molten resin, the optical fiber unit 10 (especially, the optical fibers 3) may be distorted by contraction of the sheath 30 at the time of cooling, and a signal loss of the optical fibers 3 may consequently increase. By burying the tensile strength members 20 in the sheath 30, load at the time of contraction of the sheath 30 is less likely to be applied to the tensile strength members 20, and this makes the load less likely to be applied to the optical fiber unit 10.

In one or more embodiments, the tensile strength members 20 are arranged in parallel with the optical fiber unit 10. Assume a case where the tensile strength members 20 are twisted on an outer side of the optical fiber unit 10. In this case, the tensile strength members 20 on the outer side of the optical fiber unit 10 stand in the way at the time of taking the optical fibers 3 out from the optical fiber unit 10. Consequently, the tensile strength members 20 need to be cut off, and this reduces workability. In contrast to this, because the tensile strength members 20 are merely arranged in parallel with the optical fiber unit 10 in one or more embodiments, the optical fibers 3 can easily be taken out only by removing the sheath 30. Note that a method of taking out the optical fibers 3 (a sheath removing method of the optical cable 100) according to one or more embodiments will be described later.

In the case of arranging the tensile strength members 20 and the optical fiber unit 10 in parallel as in one or more embodiments, assume that the optical fiber unit 10 and the tensile strength members 20 are in contact with each other without forming the sheath 30 between the optical fiber unit 10 and the tensile strength members 20. With this structure, no partition is formed between the optical fiber unit 10 and the tensile strength members 20, and this causes the tensile strength members 20 to dig into the optical fiber unit 10 when the optical cable 100 is bent. This may consequently damage the optical fibers 3 or increase a signal loss of the optical fibers 3. If the tensile strength members 20 are twisted, the tensile strength members 20 are prevented from digging into the optical fiber unit 10 when the optical cable 100 is bent, even if the sheath 30 is not formed between the optical fiber unit 10 and the tensile strength members 20. In this case, however, as already described above, because the tensile strength members 20 need to be cut off to take out the optical fibers 3, workability is reduced.

To address this issue, in one or more embodiments, the structure of the tensile strength members 20 being arranged in parallel with the optical fiber unit 10 is adopted while the structure of the sheath 30 being formed between the optical fiber unit 10 (more specifically, the wrapping tape 14) and the tensile strength members 20 is adopted. In other words, in one or more embodiments, the tensile strength members 20 are arranged in parallel with the optical fiber unit 10 without being in contact with the optical fiber unit 10. By forming the sheath 30 between the wrapping tape 14 of the optical fiber unit 10 and the tensile strength members 20, the sheath 30 serves as a partition separating the optical fiber unit 10 and the tensile strength members 20. This can prevent the tensile strength members 20 from digging into the optical fiber unit 10 even when the optical cable 100 is bent.

In a case of the structure of the sheath 30 being formed between the optical fiber unit 10 and the tensile strength members 20, the sheath 30 is formed on an inner side of the tensile strength members 20, and hence the housing space for the optical fiber unit 10 is narrowed. However, if the sheath 30 formed between the optical fiber unit 10 and the tensile strength members 20 is reduced in thickness to enlarge the housing space for the optical fiber unit 10, the function of the sheath 30 as a partition for separating the optical fiber unit 10 and the tensile strength members 20 may be reduced. In addition, if the sheath 30 formed between the optical fiber unit 10 and the tensile strength members 20 is reduced in thickness to increase the housing space for the optical fiber unit 10, the tensile strength members 20 may not fulfill an original function of resisting contraction of the sheath 30.

In contrast to this, in one or more embodiments, an inner wall surface of the sheath 30 formed between the optical fiber unit 10 and the tensile strength members 20 is formed to protrude toward a cable center in comparison with an inner wall surface of the sheath 30 on which no tensile strength members 20 are arranged. With this structure, the thickness of the sheath 30 around the tensile strength members 20 (including the inner side of the tensile strength members 20) can be secured. Hence, the function of the sheath 30 as the partition for separating the optical fiber unit 10 and the tensile strength members 20 and the original function of the tensile strength members 20 to resist contraction of the sheath 30 can be fulfilled. In one or more embodiments, each portion of the wrapping tape 14, the portion being arranged on the inner wall surface of the sheath 30 protruding toward the cable center is formed to depress toward the cable center. With this structure, each portion, of the wrapping tape 14, in which the sheath 30 does not protrude is not depressed, and hence a certain housing space for the optical fiber unit 10 can be secured. In other words, according to the optical cable 100 of one or more embodiments, the conflicts of securing the thickness of the sheath 30 around the tensile strength members 20 (including the inner side of the tensile strength members 20) and securing a certain housing space for the optical fiber unit 10 can both be solved.

Figure 3:
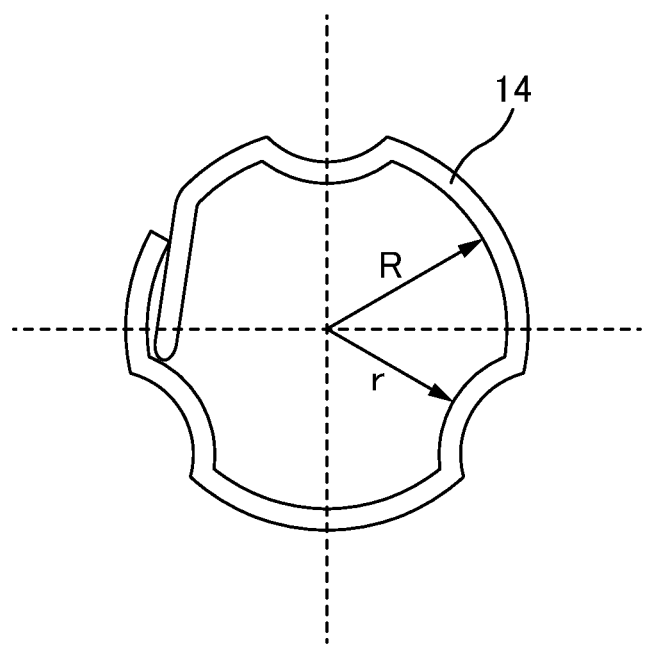
FIG. 3 is an explanatory diagram of a degree of depression of a wrapping tape 14.

FIG. 3 is an explanatory diagram of a degree of depression of the wrapping tape 14. The drawing illustrates a shape of the wrapping tape 14 at a cross section of the optical cable 100. In the drawing, r denotes the inner radius of the wrapping tape 14 on the inner side of the tensile strength members 20. In other words, r in the drawing denotes the inner radius at a depressed portion of the wrapping tape 14. In the drawing, R denotes the inner radius of a portion of the wrapping tape 14, the portion not corresponding to the inner side of the tensile strength members 20. In other words, R in the drawing denotes the inner radius at a non-depressed portion of the wrapping tape 14.

Here, the degree of depression H (%) is defined by the following equation.

$$H=(R-r)/R*100$$

In the optical cable 100 of one or more embodiments, the higher the degree of depression H is, the greater the area of the housing space (space on the inner side of the sheath 30, space of the optical fiber unit 10) with respect to the cross-sectional area of the optical cable 100 becomes, which allows the optical cable 100 to have a small outer diameter. If the degree of depression H is too high, however, the optical fibers 3 are likely to receive lateral pressure when the optical cable 100 is bent, and a transmission loss is likely to increase. In view of these, the degree of depression H (%) may be 20% or lower (to be described later).

Sheath Removing Method of Optical Cable 100

Figure 4A:
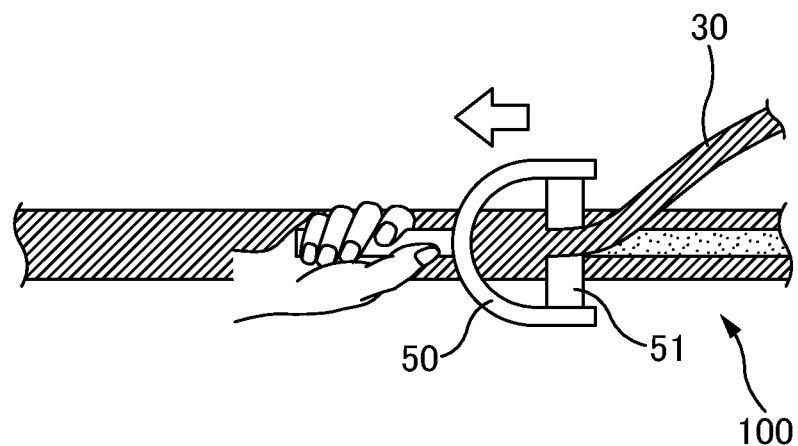
FIG. 4A and FIG. 4B are explanatory diagrams of a sheath removing method of the optical cable 100 according to one or more embodiments.
Figure 4B:
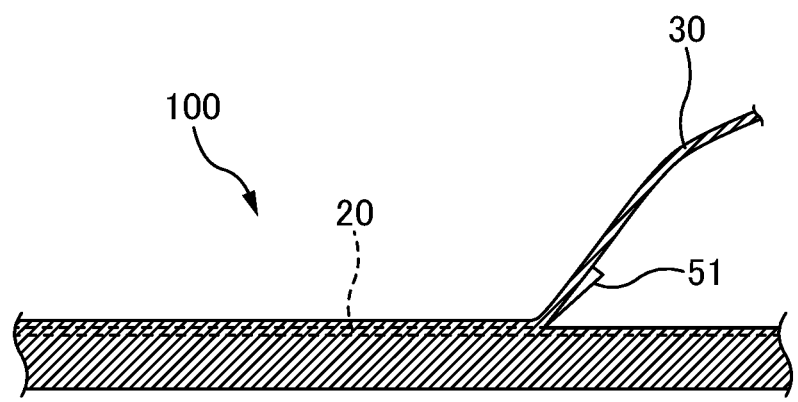

FIG. 4A and FIG. 4B are explanatory diagrams of a sheath removing method of the optical cable 100 according to one or more embodiments. In FIG. 4B (explanatory diagram of an operation of removing the sheath 30 being seen from a side), with respect to a tool 50 (stripping tool, sheath removing tool), only a blade 51 is illustrated for the convenience of explanation.

In one or more embodiments, in sheath removing of the optical cable 100, the operator causes the blade 51 (flat blade) of the tool 50 to touch the sheath 30 of the optical cable 100 so that the blade edge of the blade 51 of the tool 50 crosses the length direction and moves the blade 51 of the tool 50 in the length direction, to thereby remove the sheath 30. In other words, the operator removes the sheath 30 with the blade 51 (flat blade) of the tool 50 as planing with a plane or peeling with a peeler. Here, the direction of moving the tool 50 (length direction) is a direction orthogonal to the blade edge of the blade 51 (flat blade).

In one or more embodiments, the tensile strength members 20 arranged at intervals in the circumferential direction on the outer side of the optical fiber unit 10 are arranged in parallel with the optical fiber unit 10. Hence, the operator can access, by removing the sheath 30 in the length direction, the optical fiber unit 10 through any of gaps between the tensile strength members 20. If the tensile strength members 20 are twisted on the outer side of the optical fiber unit 10, the tensile strength members 20 on the outer side of the optical fiber unit 10 lie in the way in a state where the sheath 30 is only removed in the length direction. In this case, it is difficult to access the optical fiber unit 10 through the gaps between the tensile strength members 20 (this consequently requires cutting of the tensile strength members 20 or the like).

In addition, in one or more embodiments, because the tensile strength members 20 are arranged in parallel with the optical fiber unit 10, the operator can guide the blade 51 with the tensile strength members 20, at the time of moving the blade 51 of the tool 50 in the length direction. In other words, the tensile strength members 20 have a function as a guide for the tool 50. The blade 51 of the tool 50 coming into contact with the tensile strength members 20 can prevent further digging into the optical cable 100. Hence, the tensile strength members 20 also have a function of preventing damage to the optical fiber unit 10.

Figure 5A:
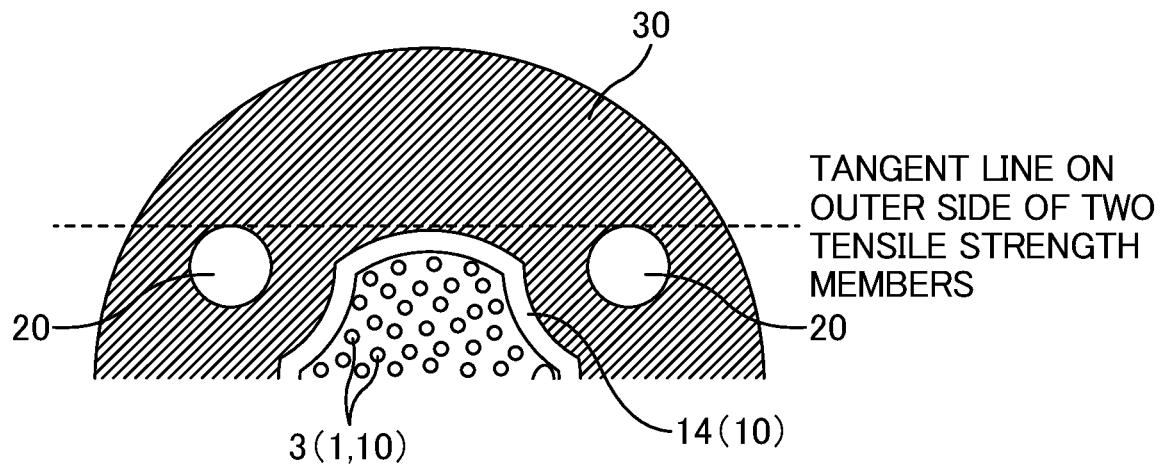
FIG. 5A and FIG. 5B are partially enlarged views of a cross section of the optical cable 100.

FIG. 5A is a partially enlarged view of a cross section of the optical cable 100. In the drawing, a tangent line on the outer side of two adjacent tensile strength members 20 is illustrated by a dotted line.

The blade 51 of the tool 50 coming into contact with the two tensile strength members 20 can prevent further digging into the optical cable 100. Thus, the tangent line on the outer side of the two tensile strength members 20 (dotted line in the drawing) indicates the limit depth for the blade edge of the tool 50.

In one or more embodiments, as illustrated in FIG. 5A, the tangent line on the outer side of the two tensile strength members 20 (dotted line in the drawing) is positioned on the outer side of the optical fiber unit 10 (specifically, the wrapping tape 14). This can prevent the blade 51 of the tool 50 from coming into contact with the optical fiber unit 10 (especially, the optical fibers 3) and can hence prevent damage to the optical fiber unit 10. Note that, however, to take the optical fibers 3 out from the optical cable 100, the operator needs to access the optical fiber unit 10 by removing the sheath 30 with the blade 51 of the tool 50 and thereafter tearing the thin-walled sheath 30 remaining on the outer side of the optical fiber unit 10.

Figure 5B:
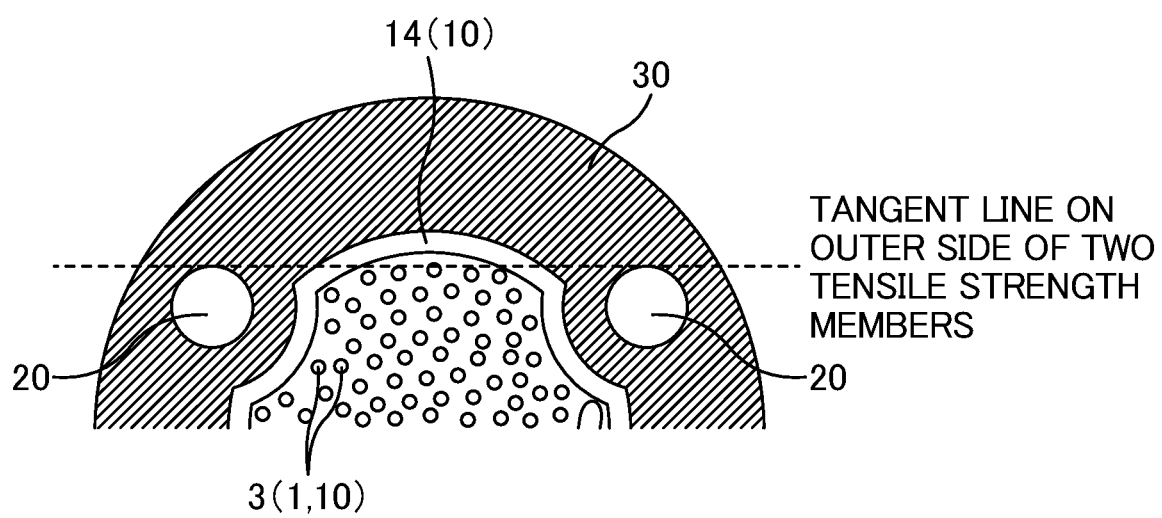

In contrast, as illustrated in FIG. 5B, the tangent line on the outer side of the two tensile strength members 20 may be positioned on an inner side of the sheath 30. In other words, part of the optical fiber unit 10 may be positioned on the outer side of the tangent line on the outer side of the two tensile strength members 20. The structure illustrated in FIG. 5B has an advantage that, because the optical fiber unit 10 is exposed when the operator removes the sheath 30 with the blade 51 of the tool 50, this makes access to the optical fiber unit 10 easier. With the structure illustrated in FIG. 5B, although the blade 51 of the tool 50 may come into contact with the optical fiber unit 10, the wrapping tape 14 of the optical fiber unit 10 is deformed with the blade 51 moving in the length direction so as to be depressed to the inside, and this can prevent damage to the optical fiber unit 10 (especially, the optical fibers 3). In particular, in one or more embodiments, each portion of the wrapping tape 14, the portion being arranged on the inner wall surface of the sheath 30 protruding toward the cable center is formed to depress toward the cable center. For this reason, when the blade 51 of the tool 50 comes into contact with the wrapping tape 14, a contacting portion is easily depressed to the inside, which makes the wrapping tape 14 less likely to be damaged. Hence, as illustrated in FIG. 5B, the tangent line on the outer side of the two tensile strength members 20 is also allowed to be positioned on the inner side of the sheath 30.

Example 1

As a first example, the optical cable 100 illustrated in FIG. 1 was manufactured. In the optical cable 100 of the first example, the three tensile strength members 20 arranged at 120-degree intervals are arranged in parallel with the optical fiber unit 10 without being in contact with the optical fiber unit 10. The optical cable 100 of the first example includes 72 optical fibers (72 optical fibers 3 are housed in the optical fiber unit 10 of the optical cable 100 of the first example).

As a first comparative example and a second comparative example, optical cables described in Patent Literature 1 (JP 2010-204368A) were manufactured. In each of the optical cables of the first comparative example and the second comparative example, three tensile strength members 20 arranged at 120-degree intervals are arranged on an outer side of a loose tube in a twisted state. The optical cable of the first comparative example includes 12 optical fibers, while the optical cable of the second comparative example includes 72 optical fibers (the number of optical fibers housed in the loose tube is 12 in the first comparative example and 72 in the second comparative example).

Figure 6:
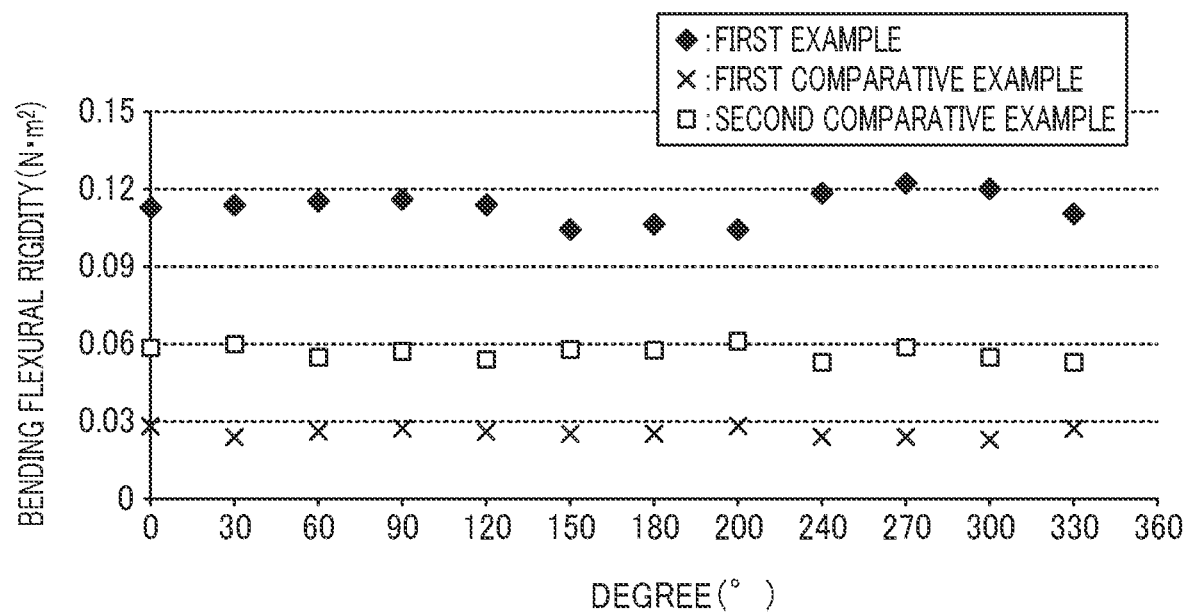
FIG. 6 is a graph of measurement results of flexural rigidities of optical cables.

FIG. 6 is a graph of measurement results of flexural rigidities of the optical cables. To investigate the isotropic properties of the flexural rigidity of each cable, the flexural rigidity (unit: N/m2) of each optical cable was measured, by changing the flexural direction in steps of 30 degrees, in each of the flexural directions. As illustrated in the graph, it is confirmed that the optical cable of the first example has almost isotropic flexural rigidity. (Note that the flexural rigidity of the optical cable 100 of the first example is four to five times greater than that of the first comparative example and is one-and-a-half to two times greater than that of the second comparative example.)

Figure 7:
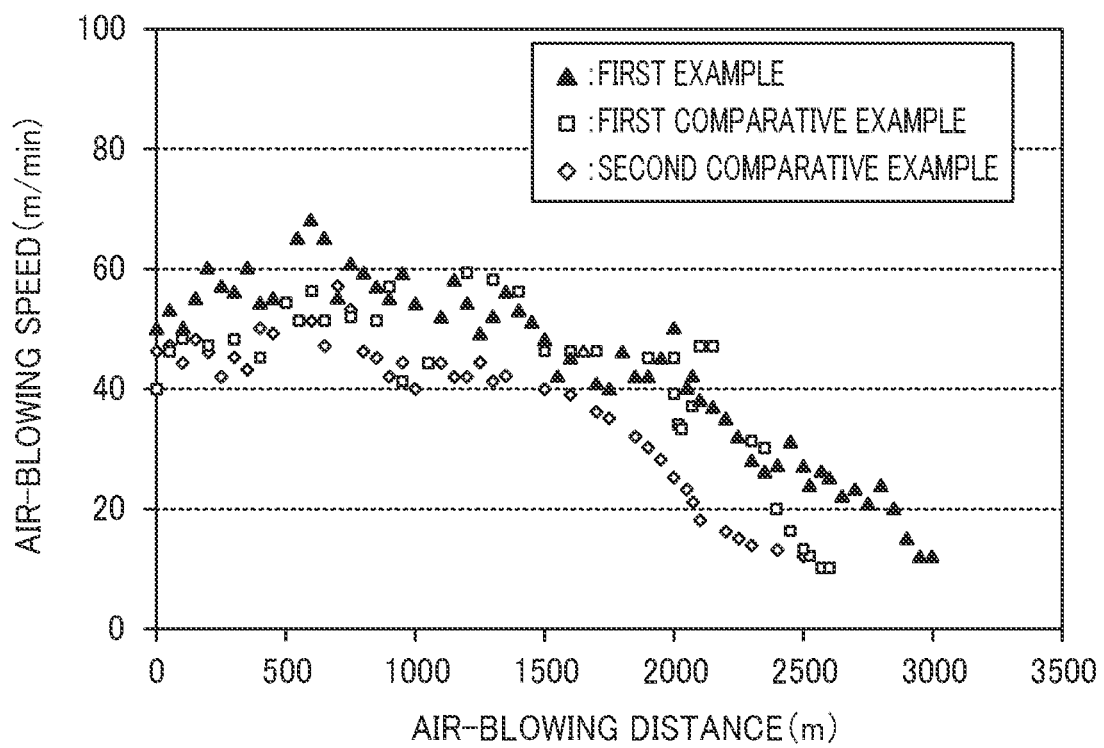
FIG. 7 is a graph of measurement results of air-blowing performance.

FIG. 7 is a graph of measurement results of air-blowing performance. For the measurement of air-blowing performance, a microduct having an inner diameter of 8 mm was prepared and was laid in an 8 shape having a circumference of approximately 125 m. Each optical cable was then air-blown installed in the microduct to measure a distance by the air-blowing. The transfer distance of the optical cable of the first example was 3000 m, and excellent air-blowing characteristics are confirmed (the transmission distance of each of the optical cables of the comparative examples was 2500 m).

Example 2

As a second example, the optical cables 100 (refer to FIG. 1) having a plurality of different rates of depression H (%) were manufactured. Each of the optical cables 100 includes 72 optical fibers (72 optical fibers 3 are housed in the optical fiber unit 10 of each of the optical cables 100).

To determine effects of the degree of depression H (%) on reduction in diameter, the outer diameter of each of the optical cables 100 was measured. By using, as a reference, the outer diameter of an optical cable having the degree of depression H (%) of 0% (optical cable with no depression), evaluations about the effects of reduction in diameter were made on the outer diameter of each of the optical cables 100 with respect to the outer diameter of the reference optical cable.

In addition, air-blowing performance of each of the optical cables 100 was measured. The method of measuring air-blowing performance is as already described. A case of having air-blowing characteristics equal to or higher than those of the above-described comparative examples was evaluated as good.

In addition, transmission characteristics of each of the optical cables 100 were measured. By using the optical cable 100 having a length of 600 m and wound around a drum with a measurement wavelength of 1.55 μm under the environment with a temperature of 20 degrees, a transmission loss (dB/km) of each of the optical fibers 3 was measured. A case where the transmission loss of the optical fiber 3 having the greatest transmission loss was smaller than 0.2 dB/km was evaluated as good, while a case where the transmission loss was 0.3 dB/km or greater was evaluated as poor.

In addition, evaluations were made on stripping characteristics of the optical cables 100. As illustrated in FIG. 4A and FIG. 4B, evaluations on stripping characteristics were made based on whether the optical fibers 3 were damaged through removing (stripping) of the sheath of each of the optical cables 100 using a tool.

Evaluation results of the effects of reduction in diameter, air-blowing characteristics, transmission characteristics, and stripping characteristics of the optical cables 100 having different rates of depression are as presented in the following table.

TABLE 1

| | | EFFECTS ON | AIR-BLOWING CHARACTERISTICS | | TRANSMISSION CHARACTERISTICS | | |
|---|---|---|---|---|---|---|---|
| DEGREE OF DEPRESSION H (%) | OUTER DIAMETER (mm) | REDUCTION IN DIAMETER (%) | AIR-BLOWING DISTANCE (m) | EVALUATION | TRANSMISSION LOSS (dB/km) | EVALUATION | STRIPPING CHARACTERISTICS |
| 0 | 6.6 | 100.0 | — | — | — | — | — |
| 1.5 | 6.5 | 98.2 | ~2500 | GOOD | Max. <0.2 | GOOD | GOOD |
| 2.5 | 6.4 | 97.0 | ~2500 | GOOD | Max. <0.2 | GOOD | GOOD |
| 5 | 6.2 | 93.9 | ~2500 | GOOD | Max. <0.2 | GOOD | GOOD |
| 7.5 | 6.0 | 90.9 | >3000 | GOOD | Max. <0.2 | GOOD | GOOD |
| 10 | 5.8 | 87.9 | >3000 | GOOD | Max. <0.2 | GOOD | GOOD |
| 15 | 5.4 | 81.8 | >3000 | GOOD | Max. <0.2 | GOOD | GOOD |
| 20 | 5.0 | 75.8 | >3000 | GOOD | Max. <0.2 | GOOD | GOOD |
| 25 | 4.6 | 69.7 | >3000 | GOOD | Max. >0.3 | POOR | GOOD |
| 30 | 4.2 | 63.6 | >3000 | GOOD | Max. >0.3 | POOR | GOOD |

It is confirmed, as presented in outer diameter (mm) and effects (%) of reduction in diameter in Table 1, that the higher the degree of depression H (%) is, the smaller the outer diameter of the optical cable 100 can be made.

It is confirmed, as illustrated in air-blowing characteristics in Table 1, that each of the optical cables 100 according to the example has air-blowing characteristics equal to or higher than those of the above-described comparative examples. In particular, it is confirmed that, when the degree of depression H is 7.5% or higher, air-blowing characteristics equal to or higher than those of the comparative examples can be obtained. This is considered to be because the higher the degree of depression H (%) is, the smaller the outer diameter of the optical cable 100 can be made, and this makes it easier for the optical cable 100 to be air-blown installed in a small microduct.

In contrast, as presented in the transmission characteristics in Table 1, when the degree of depression H (%) is 25% or higher, the transmission characteristics are evaluated as poor. The reason of deterioration of the transmission characteristics is considered to be because of lateral pressure being applied to the optical fibers 3 at the time when the optical cables 100 were bent. In view of this, it is confirmed that the degree of depression H (%) may be 20% or lower.

As presented in the evaluation results of stripping characteristics in Table 1, no damage to the optical fibers 3 was found in any of the optical cables 100. Hence, the sheath removing method illustrated in FIG. 4A is confirmed to be effective to the optical cable 100 having the structure illustrated in FIG. 1.

Example 3

As a third example, optical cables with four to six tensile strength members arranged at equal intervals in a circumferential direction (intervals of 360 degrees/N in the circumferential direction, where N is the number of tensile strength members) were manufactured. Note that the structure of each of the optical cables of the third example is approximately the same as that of the optical cable of the first example, except for the number of the tensile strength members N. Hence, also in the third example, the tensile strength members are arranged in parallel with the optical fiber unit, the sheath is formed between the optical fiber unit and the tensile strength members, portions of the inner wall surface of the sheath formed between the optical fiber unit and the tensile strength members protrude toward the cable center in comparison with portions of the inner wall surface of the sheath arranged with no tensile strength members, and portions of a wrapping tape arranged on the portions of the inner wall surface of the sheath protruding toward the cable center are configured to be depressed toward the cable center. Assume that the number of tensile strength members is N. Each of the optical cables of N=3, 4 includes 72 optical fibers, while each of the optical cables of N=5, 6 includes 288 optical fibers.

Figure 8:
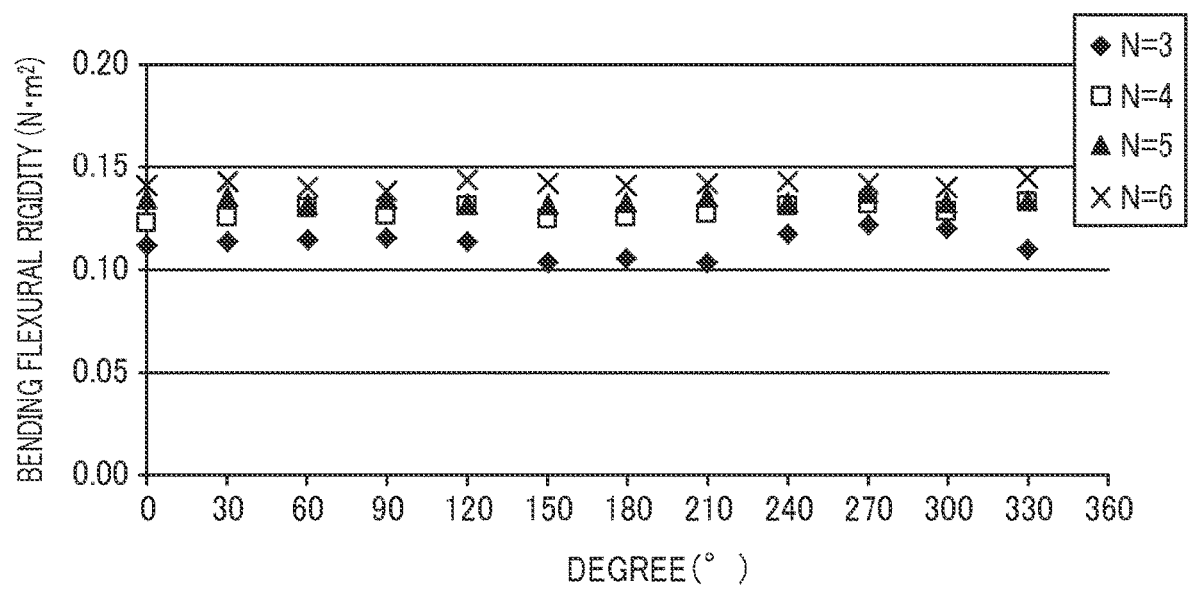
FIG. 8 is a graph of measurement results of flexural rigidities of optical cables according to a third example.

FIG. 8 is a graph of measurement results of flexural rigidities of the optical cables according to the third example (and the first example). To investigate the isotropic properties of the flexural rigidity of each cable, the flexural rigidity (unit: N/m2) of each optical cable was measured, by changing the flexural direction in steps of 30 degrees, in each of the flexural directions. As illustrated in the graph, it is also confirmed that the optical cables of the third example (N=4 to 6), similar to the optical cable of the first example (N=3), have almost isotropic flexural rigidities.

Figure 9:
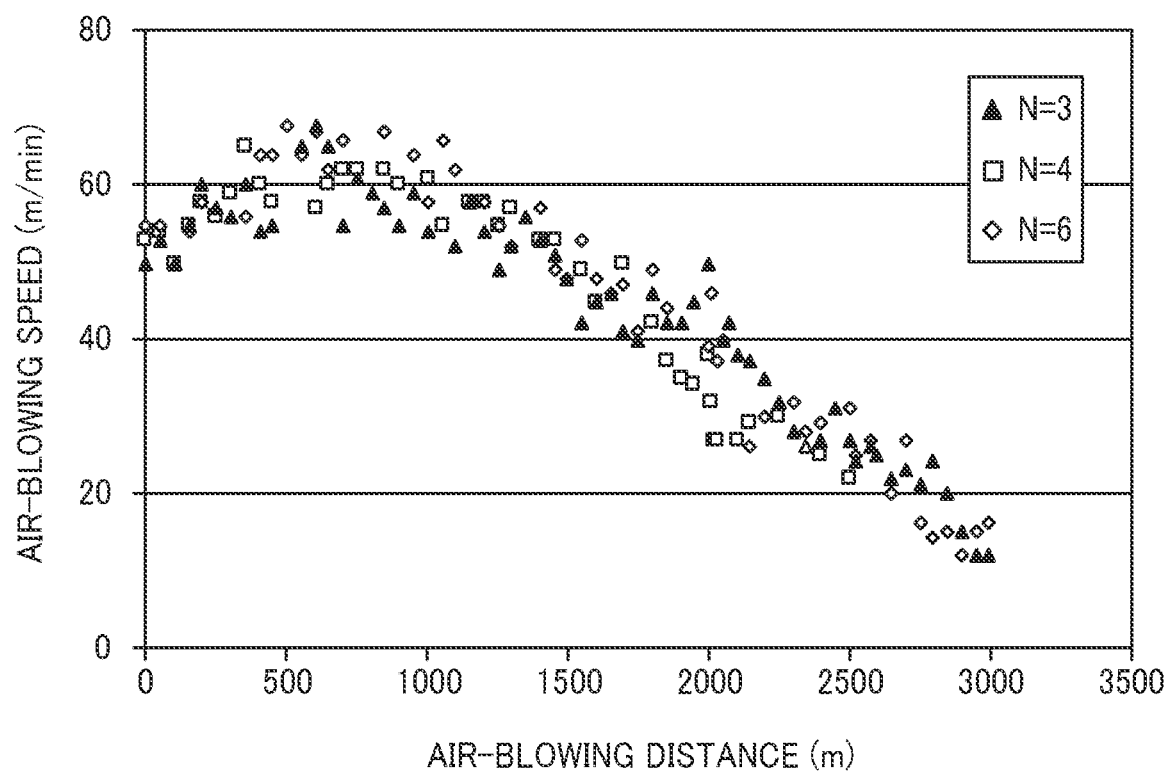
FIG. 9 is a graph of measurement results of air-blowing performance in the third example.

FIG. 9 is a graph of measurement results of air-blowing performance according to the third example (and the first example). As presented in the measurement results, it is also confirmed for the optical cables of the third example (N=4 and 6), similar to the optical cable of the first example (N=3), to have excellent air-blowing characteristics.

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber ribbon;
3: Optical fiber;
5: Connection part;
7: Non-connected part;
10: Optical fiber unit;
11: Bundle unit;
12: Bundling member;
14: Wrapping tape;
20: Tensile strength member;
30: Sheath;

50: Tool;
51: Blade;
100: Optical Cable.

The invention claimed is:

1. An optical cable comprising:
   an optical fiber unit in which a plurality of optical fibers are wrapped with a wrapping tape;
   three tensile strength members disposed in parallel with and on an outer side of the optical fiber unit at intervals in a circumferential direction; and
   a sheath that coats the optical fiber unit and the tensile strength members and that is disposed between the optical fiber unit and the tensile strength members, wherein
   an inner wall surface of the sheath formed between the optical fiber unit and the tensile strength members protrudes toward a cable center in comparison with an inner wall surface of the sheath where none of the tensile strength members are disposed, and
   a portion of the wrapping tape disposed on the inner wall surface that protrudes toward the cable center is depressed toward the cable center.

2. The optical cable according to claim 1, wherein the optical cable has exactly three tensile strength members.

3. The optical cable according to claim 1, wherein a degree of depression H (%) is 20% or lower when:
   an inner radius of the depressed portion of the wrapping tape is r,
   an inner radius of a non-depressed portion of the wrapping tape is R, and
   the degree of depression H (%) is H=(R—r)/R * 100.

4. The optical cable according to claim 1, wherein a tangent line on an outer side of two adjacent ones of the tensile strength members is disposed on an outer side of the optical fiber unit.

5. The optical cable according to claim 1, wherein part of the optical fiber unit is disposed on an outer side of a tangent line on an outer side of two adjacent ones of the tensile strength members.

6. A sheath removing method comprising:
   causing a blade of a tool to contact a sheath of an optical cable so that the blade of the tool crosses a length direction of the optical cable; and
   moving the tool in the length direction, wherein
   the optical cable comprises:
     the sheath;
     an optical fiber unit in which a plurality of optical fibers are wrapped with a wrapping tape; and
     three tensile strength members disposed in parallel with and on an outer side of the optical fiber unit at intervals in a circumferential direction, wherein
     the sheath coats the optical fiber unit and the tensile strength members, and
   while the tool is moved in the length direction, the blade of the tool is guided by the tensile strength members.

7. The sheath removing method according to claim 6, wherein, in removing the sheath, the blade of the tool is in contact with two adjacent ones of the tensile strength members.

8. A sheath removing method comprising:
   causing a blade of a tool to contact a sheath of an optical cable so that the blade of the tool crosses a length direction of the optical cable; and
   moving the tool in the length direction, wherein
   the optical cable comprises:
     the sheath;
     an optical fiber unit in which a plurality of optical fibers are wrapped with a wrapping tape; and
     three tensile strength members disposed in parallel with and on an outer side of the optical fiber unit at intervals in a circumferential direction, wherein
     the sheath coats the optical fiber unit and the tensile strength members, and
   in removing the sheath with the tool, the wrapping tape is deformed to be depressed toward an inner side with the blade moving in the length direction.

9. The optical cable according to claim 1, wherein the tensile strength members are arranged at equal intervals in the circumferential direction.

10. The sheath removing method according to claim 6, wherein the tensile strength members are arranged at equal intervals in the circumferential direction.

* * * * *